(12) United States Patent
Yamamoto et al.

(10) Patent No.: US 11,128,112 B2
(45) Date of Patent: Sep. 21, 2021

(54) WIRE HARNESS ROUTING DEVICE

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Satoshi Yamamoto, Mie (JP); Makoto Higashikozono, Mie (JP); Hisashi Sawada, Mie (JP); Kazuyoshi Ohara, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 139 days.

(21) Appl. No.: 16/611,905

(22) PCT Filed: Apr. 20, 2018

(86) PCT No.: PCT/JP2018/016237
§ 371 (c)(1),
(2) Date: Nov. 8, 2019

(87) PCT Pub. No.: WO2018/207589
PCT Pub. Date: Nov. 15, 2018

(65) Prior Publication Data
US 2021/0151966 A1    May 20, 2021

(30) Foreign Application Priority Data
May 10, 2017  (JP) .............................. JP2017-093764

(51) Int. Cl.
*H02G 11/00*  (2006.01)
*H02G 3/04*  (2006.01)
(Continued)

(52) U.S. Cl.
CPC ............. *H02G 3/0475* (2013.01); *B60N 2/06* (2013.01); *B60R 16/0215* (2013.01); *H02G 11/006* (2013.01)

(58) Field of Classification Search
CPC . B60R 16/0125; H02G 11/006; H02G 3/0475
See application file for complete search history.

(56) References Cited

U.S. PATENT DOCUMENTS 6,444,912 B1 *  9/2002  Grossman ........... B60R 16/0215
                                                    174/135
7,381,898 B2 *  6/2008  Ide ..................... B60R 16/0207
                                                    174/68.3
(Continued)

FOREIGN PATENT DOCUMENTS

| JP | 2003-235126 A | 8/2003 |
| JP | 2013-042658 A | 2/2013 |
| JP | 2014-200157 A | 10/2014 |

OTHER PUBLICATIONS

International Search Report dated Jun. 19, 2018 for WO 2018/207589 A1.

*Primary Examiner* — William H. Mayo, III
*Assistant Examiner* — Krystal Robinson
(74) *Attorney, Agent, or Firm* — Abelman, Frayne & Schwab

(57) ABSTRACT

A wire harness routing device has a wire harness, one end of which is connected to a slider that is slidably attached to a rail and the other end of which is drawn out from the rail, a folding guide part that curves the wire harness that is drawn out from the rail and folds it in the direction along the rail, and an accommodation part that has a bottom wall and a side wall that rises up from the side edges of the bottom wall. The wire harness has a straight line-shaped linear part that is disposed along the rail, and a curved part that is further folded back to conform to the opposed side of the folding (Continued)

guide part of the linear part, a slidable holding member, and a separation guide part that separates the linear part from the side wall is provided on the slidable holding member.

8 Claims, 15 Drawing Sheets

(51) Int. Cl.
  *B60R 16/02* (2006.01)
  *B60N 2/06* (2006.01)

(56) References Cited

U.S. PATENT DOCUMENTS

| | | | |
|---|---|---|---|
| 8,247,921 B2* | 8/2012 | Ushiyama | H02G 11/006 307/10.1 |
| 9,573,536 B2* | 2/2017 | Katou | B60N 2/90 |
| 10,315,594 B2* | 6/2019 | Yamamoto | B60R 16/03 |
| 2001/0052203 A1* | 12/2001 | Doshita | B60R 16/0215 49/502 |
| 2003/0121692 A1* | 7/2003 | Kato | B60R 16/0215 174/68.1 |
| 2004/0017648 A1* | 1/2004 | Tsubaki | B60R 16/0215 361/601 |
| 2005/0092511 A1* | 5/2005 | Sekino | B60R 16/0215 174/72 A |
| 2006/0027391 A1* | 2/2006 | Tsubaki | H02G 11/006 174/72 A |
| 2006/0199416 A1* | 9/2006 | Tsubaki | B60R 16/027 439/352 |
| 2008/0142260 A1* | 6/2008 | Yamaguchi | H02G 11/00 174/72 A |
| 2009/0020331 A1* | 1/2009 | Tsubaki | H02G 11/00 174/72 A |
| 2012/0024564 A1 | 2/2012 | Sekino et al. | |
| 2014/0339376 A1* | 11/2014 | Katou | B60R 16/027 248/49 |
| 2016/0257268 A1* | 9/2016 | Tsubaki | E05F 15/646 |
| 2018/0361960 A1 | 12/2018 | Yamamoto et al. | |
| 2019/0054868 A1 | 2/2019 | Yamamoto et al. | |

\* cited by examiner

WIRE HARNESS ROUTING DEVICE

CROSS REFERENCE TO RELATED APPLICATIONS

This application is a national phase of PCT application No. PCT/JP2018/016237, filed on 20 Apr. 2018, which claims priority from Japanese patent application No. 2017-093764, filed on 10 May 2017, all of which are incorporated herein by reference.

TECHNICAL FIELD

The technique that is disclosed in this specification relates to a wire harness routing device.

BACKGROUND

Conventionally, the device described in Patent Document 1 is known as a wire harness routing device that electrically connects the vehicle to a sliding part such as a sliding seat that is loaded on the vehicle. This wire harness routing device includes a rail, a slider that is slidably attached to the rail, a wire harness that is disposed inside the rail and one end of which is coupled to the slider, and an excess length accommodation part that accommodates the excess length of the wire harness that is expelled to the outside of the rail. The wire harness may include an outer covering.

PRIOR ART DOCUMENT

Patent Document

Patent Document 1: JP 2013-042658A

SUMMARY OF THE INVENTION

Problems to be Solved

Based on this configuration, when the slider moves through the inside of the rail, the wire harness that is connected to the slider also moves through the inside of the rail along with the movement of the slider. The excess length of the wire harness that is expelled from the rail is accommodated inside the excess length accommodation part, but at this time the wire harness abrades with the side wall of the excess length accommodation part, so there are the problems that the wire harness is damaged and loud noise is generated.

The technique that is disclosed in this specification was completed based on this state of affairs, and its object is the provision of a wire harness routing device that can prevent the abrading between the wire harness and the side wall of the accommodation part.

Means to Solve the Problem

The technique that is disclosed in the present specification is a wire harness routing device that has a wire harness, one end of which is connected to a slider that is slidably attached to a rail and the other end of which is drawn out from the rail, a folding guide part that curves the wire harness that is drawn out from the rail and folds it back in the direction along the rail, and an accommodation part that has a bottom wall and a side wall that rises up from the side edges of said bottom wall, and that accommodates the wire harness that is folded back by the folding guide part, wherein the wire harness has, inside the accommodation part, a straight line-shaped linear part that is disposed along the rail, and a curved part that is further folded in such a manner that the wire harness runs along the rail, the curved part being disposed on that side of the linear part that is opposite of the folding guide part, a slidable holding member that can move along the extension direction of the linear part while holding the curved part such that it can slide along the curve direction of the curved part is provided on the accommodation part, and a separation guide part that separates the linear part from the side wall is provided on the slidable holding member.

According to such a configuration, the linear part of the wire harness is positioned such that it is separated from the side wall of the accommodation part so the abrading between the wire harness and the side wall of the accommodation part can be prevented by the separation guide part that is provided on the slidable holding member. Owing to this, damage to the wire harness can be prevented and the size of the noise that is generated can be held in check.

The wire harness routing device may include the following configuration.

The slidable holding member may have an outside guide wall that guides the wire harness in a curve direction, and the separation guide part may be a spacer wall that extends from the outside guide wall and is positioned between the linear part of the wire harness and the side wall.

In this manner, an embodiment in which the above-described spacer wall is provided can be cited as one embodiment for realizing the separation guide part.

A movement guide part that guides the movement of the slidable holding member in a direction along the extending direction of the linear part may also be provided. According to such a configuration, it is possible to stably move the slidable holding member in the normal movement direction inside the accommodation part.

The separation guide part may be disposed at a distance from the side wall. According to such a configuration, not only the wire harness but also the separation guide part is positioned such that they are separated from the side wall, and the generation of noise can be further held in check.

An inclination restricting part that restricts the inclination in the direction that intersects with the bottom wall of the slidable holding member may also be provided. According to such a configuration, the inclination of the slidable holding member towards the bottom wall due to vibration or the like can be prevented.

The folding guide part may have an outside curved wall that curves the wire harness in a direction along the rail, and the side wall of the accommodation part may be disposed further outward than that region of the outside curved wall that is adjacent to the side wall, creating a step shape with the outside curved wall.

According to such a configuration, the linear part of the wire harness that is drawn out from the folding guide part to the inside of the accommodation part is positioned at a distance from the side wall by not only the separation accommodation part but also the step part, so the abrading between the wire harness and the side wall of the accommodation part can be prevented more reliably.

In the wire harness the area around the plurality of electric wires may be covered by an outer covering, and the bending of the outer covering may be allowed in only one direction. According to such a configuration, the damage to the wires can be prevented by the outer covering, and the bending of the wire harness in a direction that is different from the direction in which the wires are supposed to bend is prevented.

A soundproofing material may be provided between the wire harness and the side wall. According to such a configuration, the generation of noise can be prevented by the soundproofing material even if the wire harness is in contact with the side wall.

Effect of the Invention

According to the technique that is disclosed in this specification, a wire harness routing device that can prevent the abrading between the wire harness and the side wall of the accommodation part is obtained.

DETAILED DESCRIPTION TO EXECUTE THE INVENTION

A description of one embodiment is provided with reference to FIG. 1 to FIG. 15. The wire harness routing device 10 of the present embodiment routes a wire harness 11 between the body (not illustrated) and a seat 70 of a vehicle like an automobile. In the following description, the X direction in FIG. 2 is rightwards, the Y direction is forwards and the Z direction is upwards.

(Wire Harness Routing Device 10)

Figure 2:
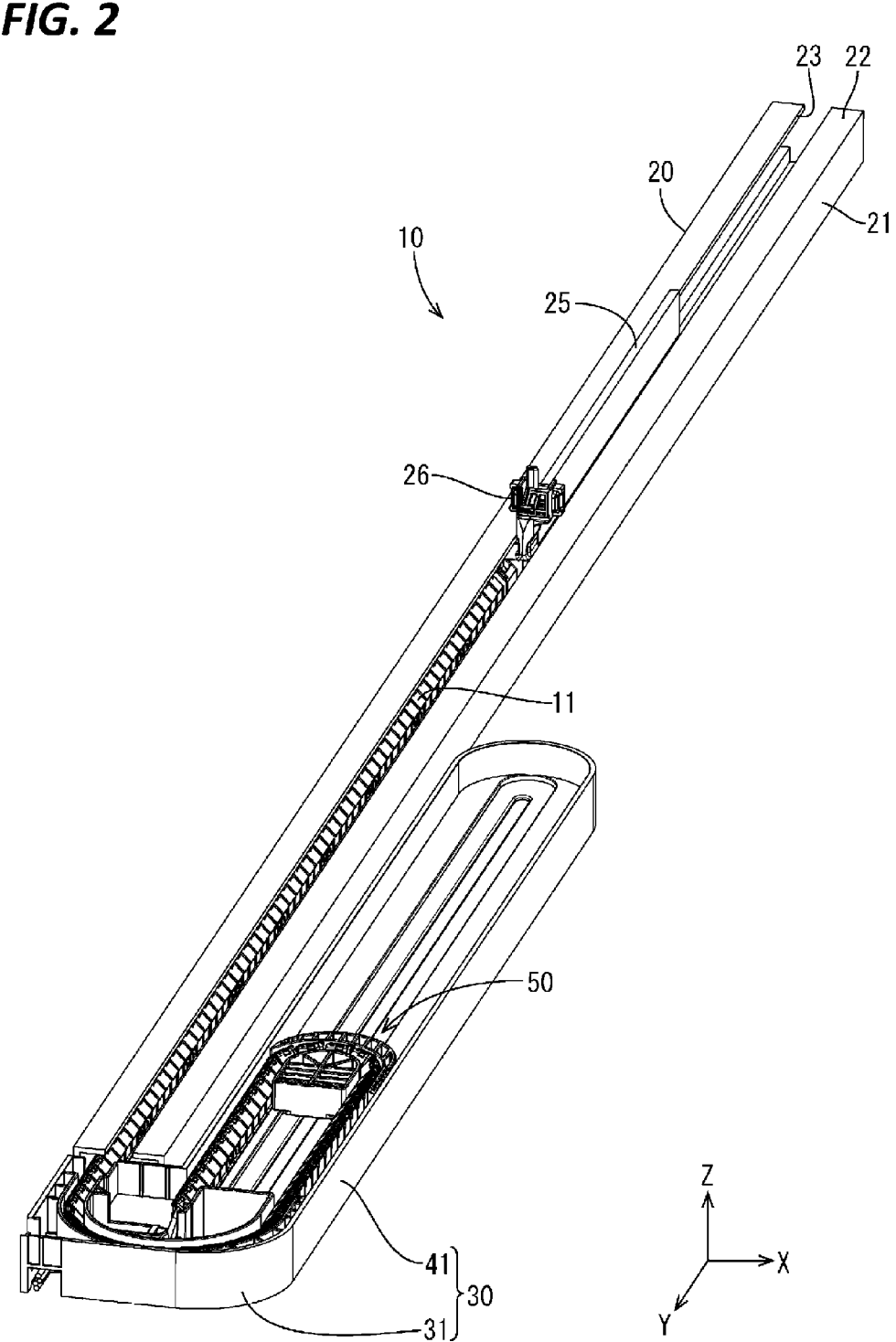
FIG. 2 is an oblique view of the wire harness routing device.

As shown in FIG. 2, the wire harness routing device 10 includes a wire harness 11, one end of which is connected to a slider 25 that is slidably connected to a rail 20, and the other end is drawn out from the rail 20, and an excess length accommodation part 30 that absorbs the excess length of the wire harness 11 that is drawn out from the rail 20.

(Wire Harness 11)

The wire harness 11 is routed above the floor (below the mat or panel thereof) or below the floor of the chassis, and is connected to a device like an ECU (electronic control unit) on the chassis side. The supply of power and the sending and receiving of signals between the devices on the chassis side and the electrical equipment of the seat 70 is performed through this wire harness 11. Optional equipment can be employed as needed, for example a motor for an electric slide or electric reclining, a seat heater, etc. can be employed.

Figure 7:
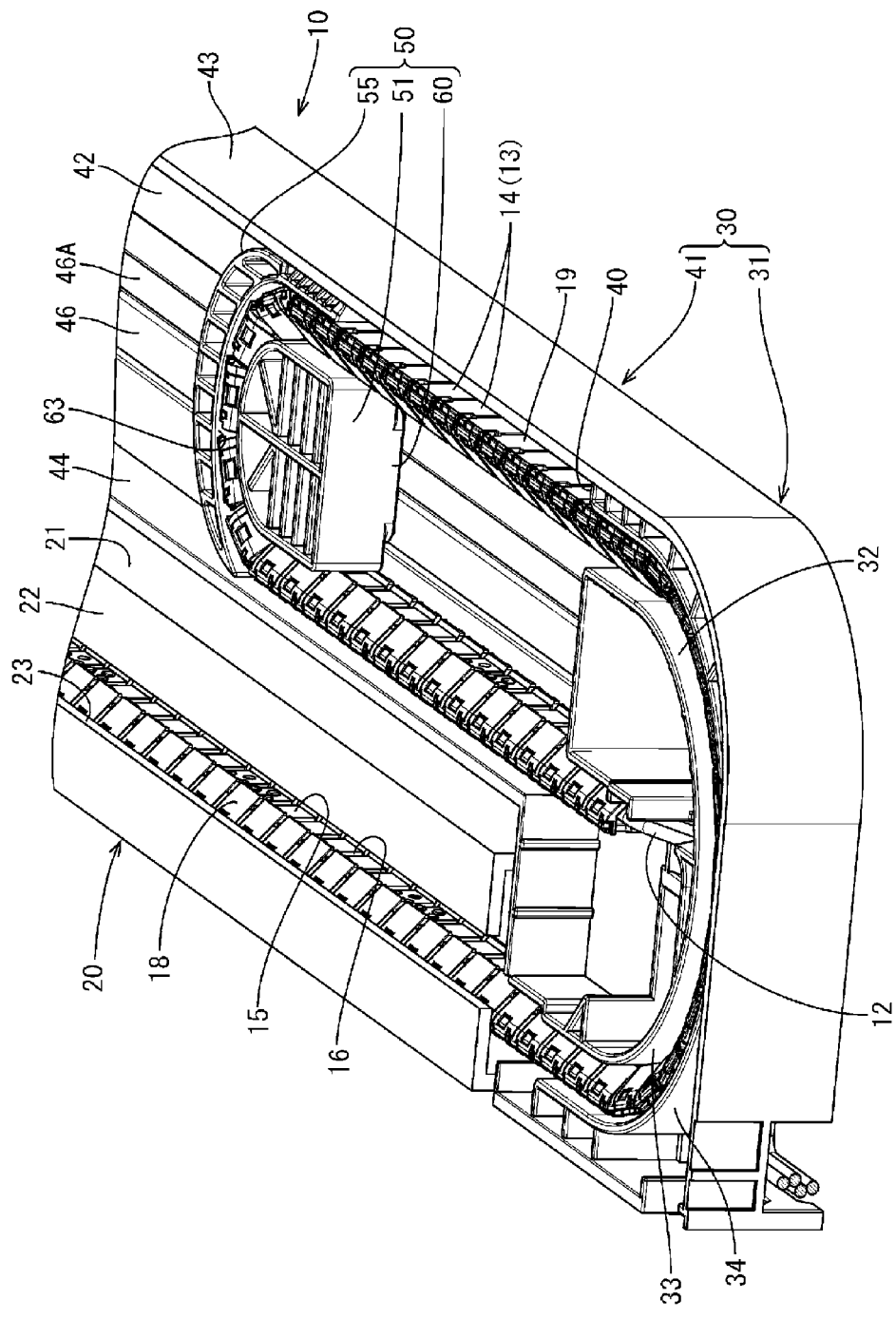
FIG. 7 is an oblique view of a state in which the wire harness is disposed on the slidable holding member and the excess length accommodation part.
Figure 8:
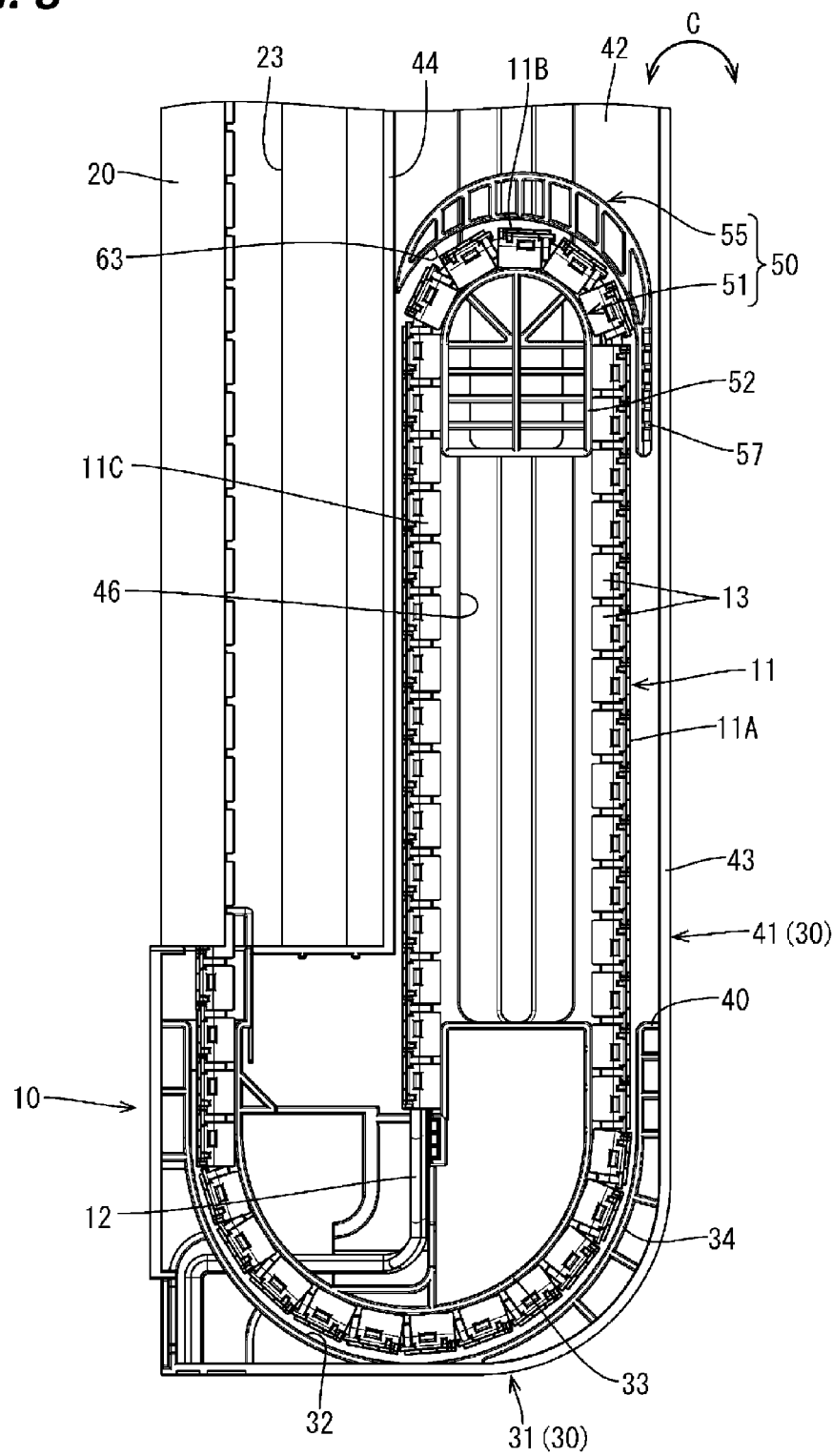
FIG. 8 is a partially enlarged plan view of FIG. 7.

As shown in FIG. 7 and FIG. 8, the routed wire harness 11 is inserted into the rail 20 and the excess length accommodation part 30. The wire harness 11 includes a plurality of electrical wires 12 (4 in the present embodiment) and an outer covering 13 that covers this plurality of electrical wires 12. The electrical wires 12 are covered cables, in which a metal conductor made of copper, copper alloy, aluminum, aluminum alloy or the like is covered by an insulating layer, and the electrical wires 12 are connected to various electrical components in the seat 70.

Figure 9:
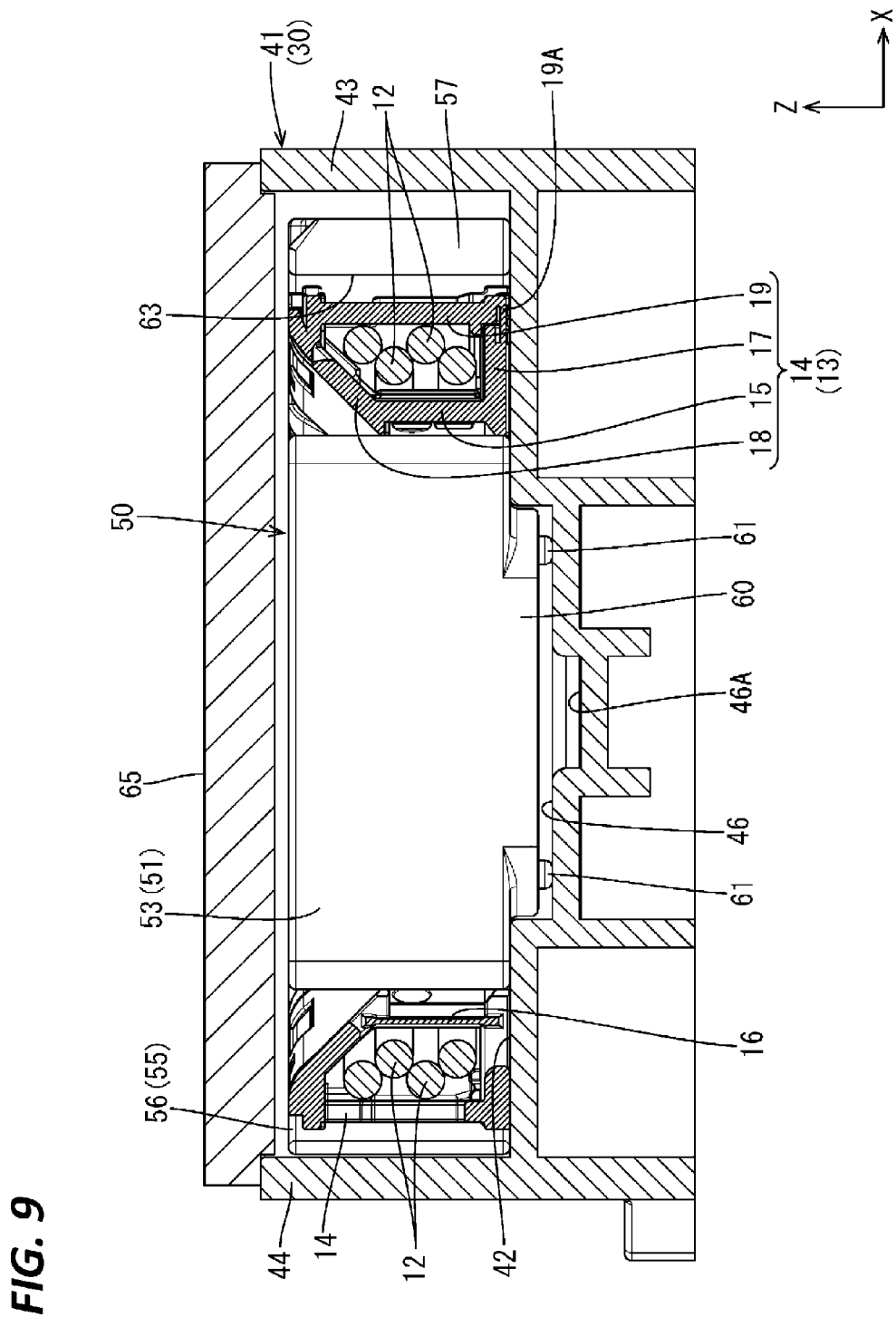
FIG. 9 is an oblique view of a state in which the wire harness is disposed on the slidable holding member and the accommodation part.
Figure 10:
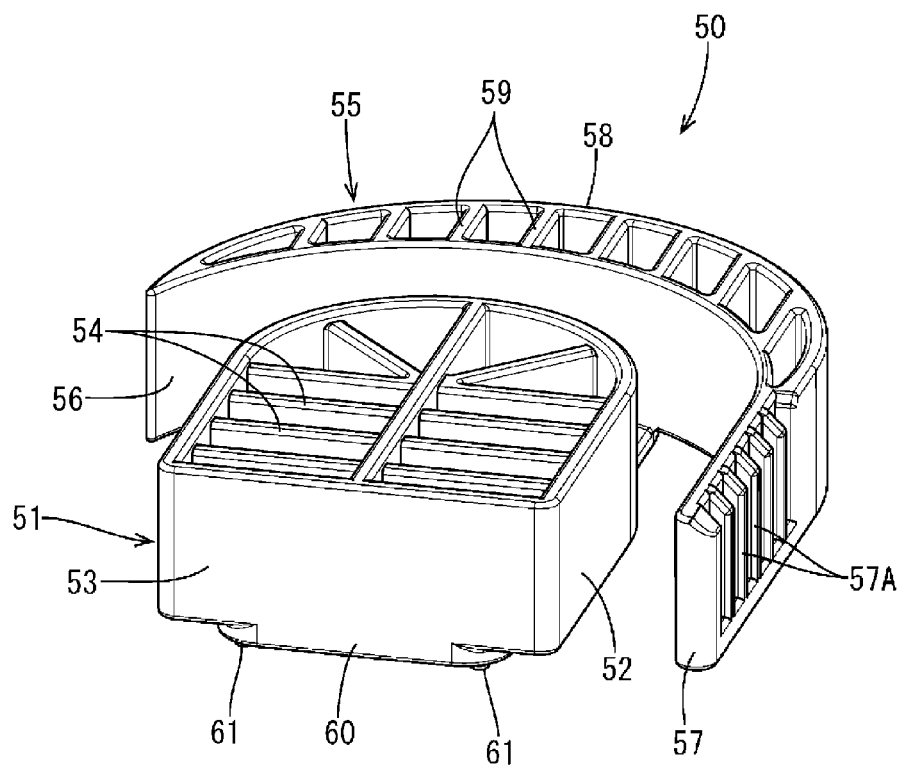
FIG. 10 is an oblique view of the slidable holding member.
Figure 11:
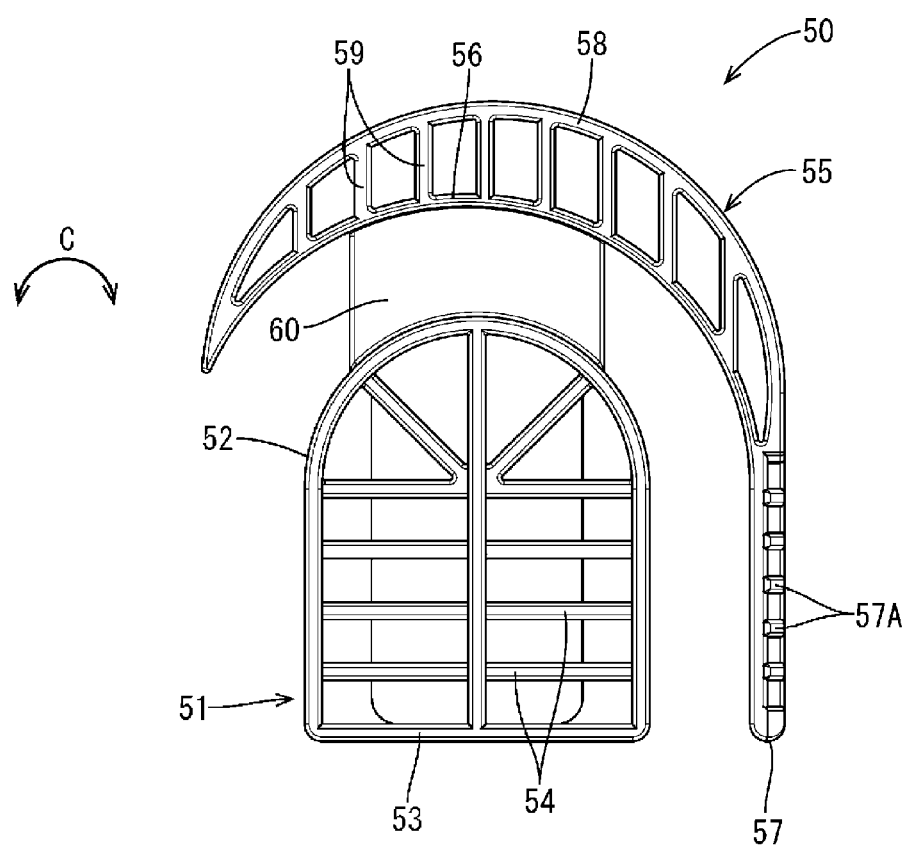
FIG. 11 is a plan view of the same.
Figure 12:
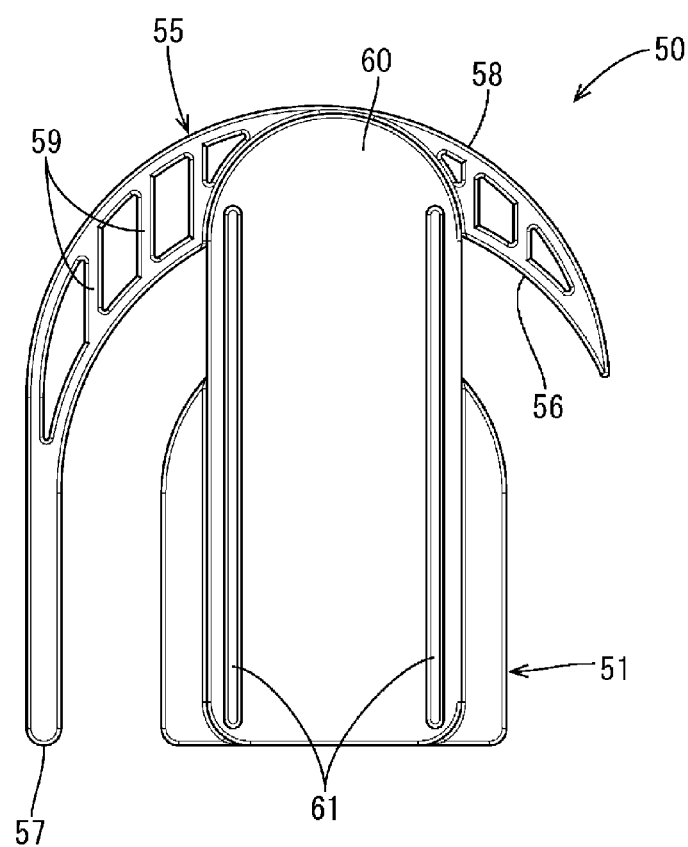
FIG. 12 is a bottom view of the same.
Figure 13:
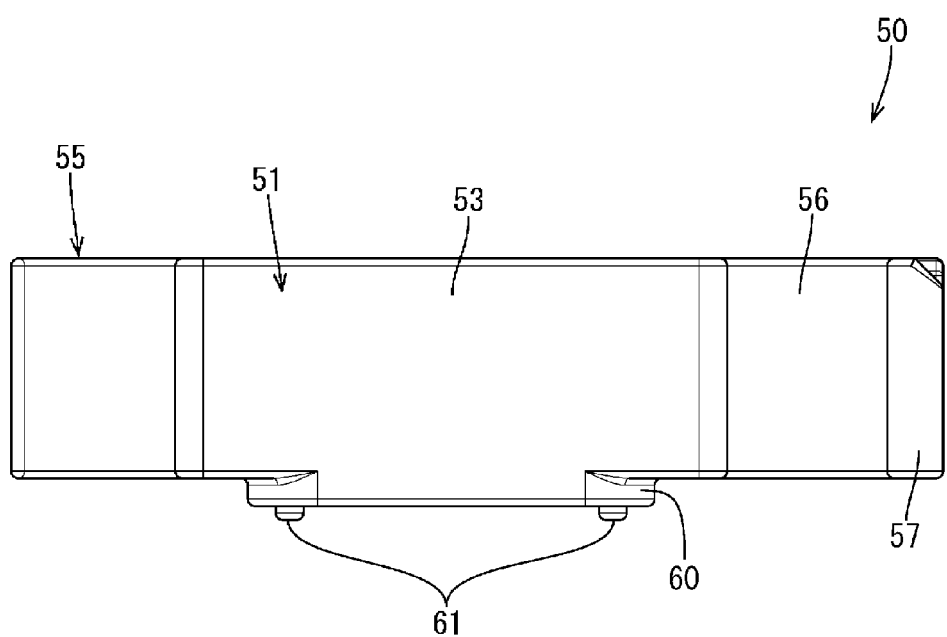
FIG. 13 is a frontal view of the same.
Figure 14:
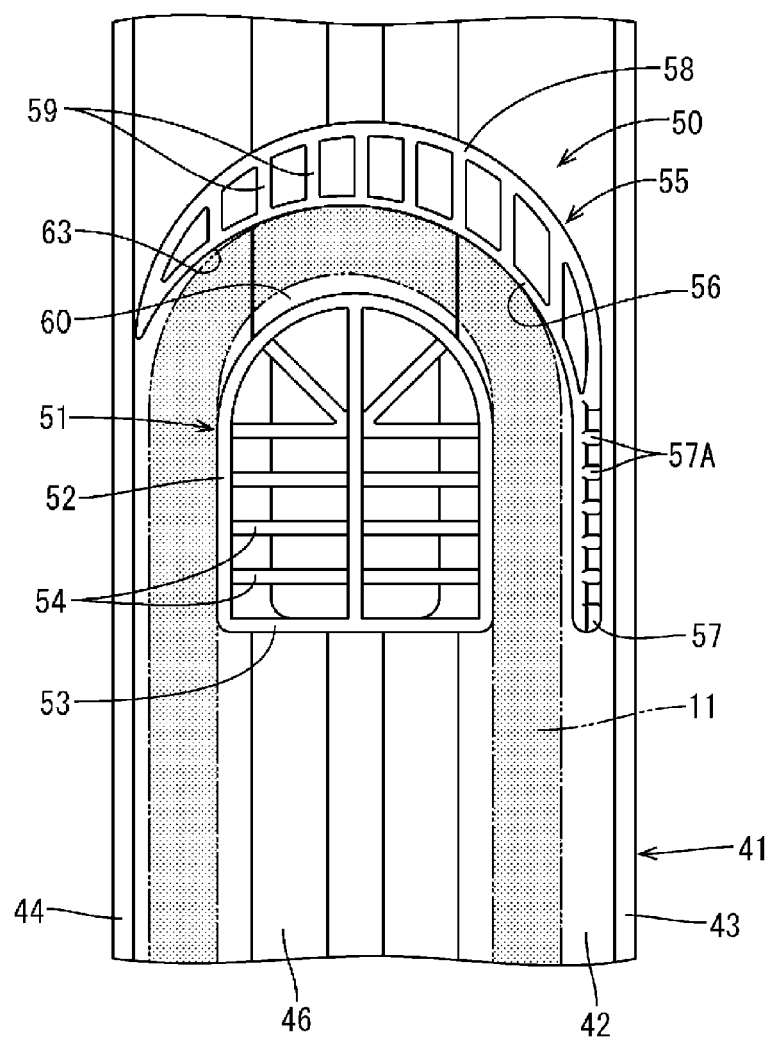
FIG. 14 is a conceptual diagram that shows the relationship between the slidable holding member and the wire harness.

The outer covering 13 is made for example of synthetic resin, and as shown in FIG. 9, it is constituted by the concatenation of a plurality of polygonal tube parts 14 that use as one side wall a belt-shaped part 15 that extends in a belt shape along the electrical wires 12. The belt-shaped part 15 is provided at predetermined intervals with a plurality of flexible parts 16 with flexibility. Owing to the fact that the outer face side of the flexible parts 16 is notched across their entire width, their thickness is reduced to the extent that they can be flexed, and due to this the belt-shaped part 15 can curve in a direction that intersects with the plate face.

The polygonal tube parts 14 include one pair of side walls 17, 18 that is connected in such a manner that it rises up from the two side edges of the belt-shaped part 15. One is a lower side wall 17 that is disposed orthogonally to the plate face of the belt-shaped part 15, while the other side is an upper side wall 18 that is tilted outward from the vertical orientation. In addition, the side wall that is opposed to the belt-shaped part 15 serves as a cover part 19, and one end thereof can open and close and rotate through a hinge 19A on the lower side wall. In a state in which the lid part 19 is closed, the polygonal tube parts 14 are configured as quadrangular tubes with a right-angled trapezoidal cross section.

The outer covering 13 is formed such that it can curve only in one direction, with the belt-shaped part 15 on the inside. Whenever the outer covering 13 attempts to curve in the direction with the belt-shaped part 15 on the outer side, curve restricting parts that are provided on the polygonal tube parts 14 abut against each other, and the curving in that direction is impeded.

(Rail 20)

The rail 20 is made of metal, and a pair of rails 20 is provided on top of the floor for each seat 70. As the metal that constitutes the rail 20, any suitable metal can be selected as appropriate, such as stainless steel, aluminum, aluminum alloy, etc. The rail 20 is formed such that it extends linearly in the front to back direction (the Y direction in FIG. 2). The rail 20 has a bottom wall (not shown in the figures) that extends in the front to back direction, a pair of side walls 21 that rises upwards from the left and right side edges of the bottom wall, and an upper wall 22 that couples the upper end edge of the pair of side walls 21, and is formed by providing a through groove 23 that extends in the front to back direction in the upper wall 22.

As shown in FIG. 2, inside the rail 20 a slider 25 is disposed that is slidable relative to the rail 20. The wire harness 11 is inserted in a guide member 26 that is fixed on the front end part of the slider 25 inside the rail 20, and the direction in which the wire harness 11 extends is converted from the front to back direction (the Y direction) to upwards (the seat 70 side, Z direction) by this guide member 26.

(Excess Length Accommodation Part 30)

Figure 3:
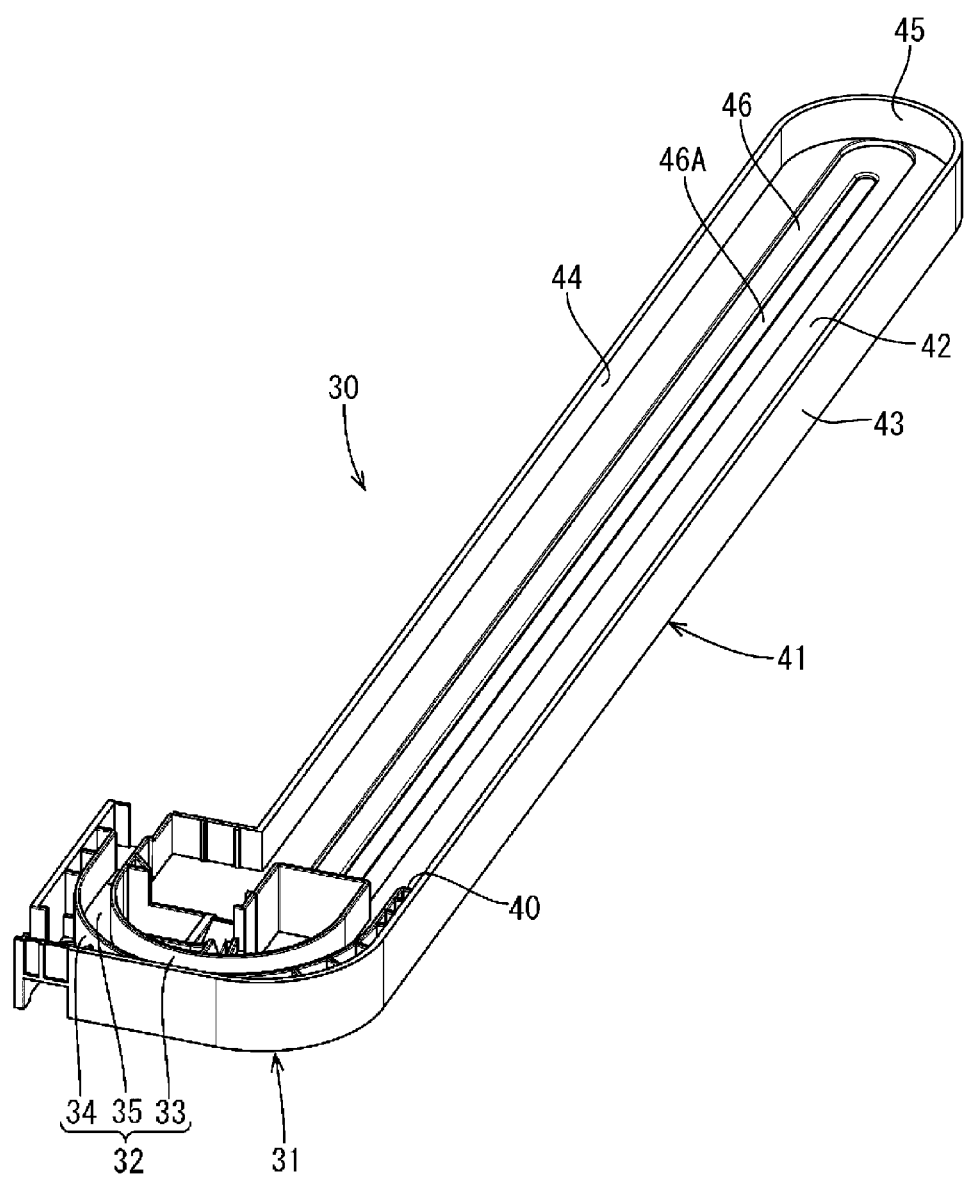
FIG. 3 is an oblique view of the excess length accommodation part.
Figure 4:
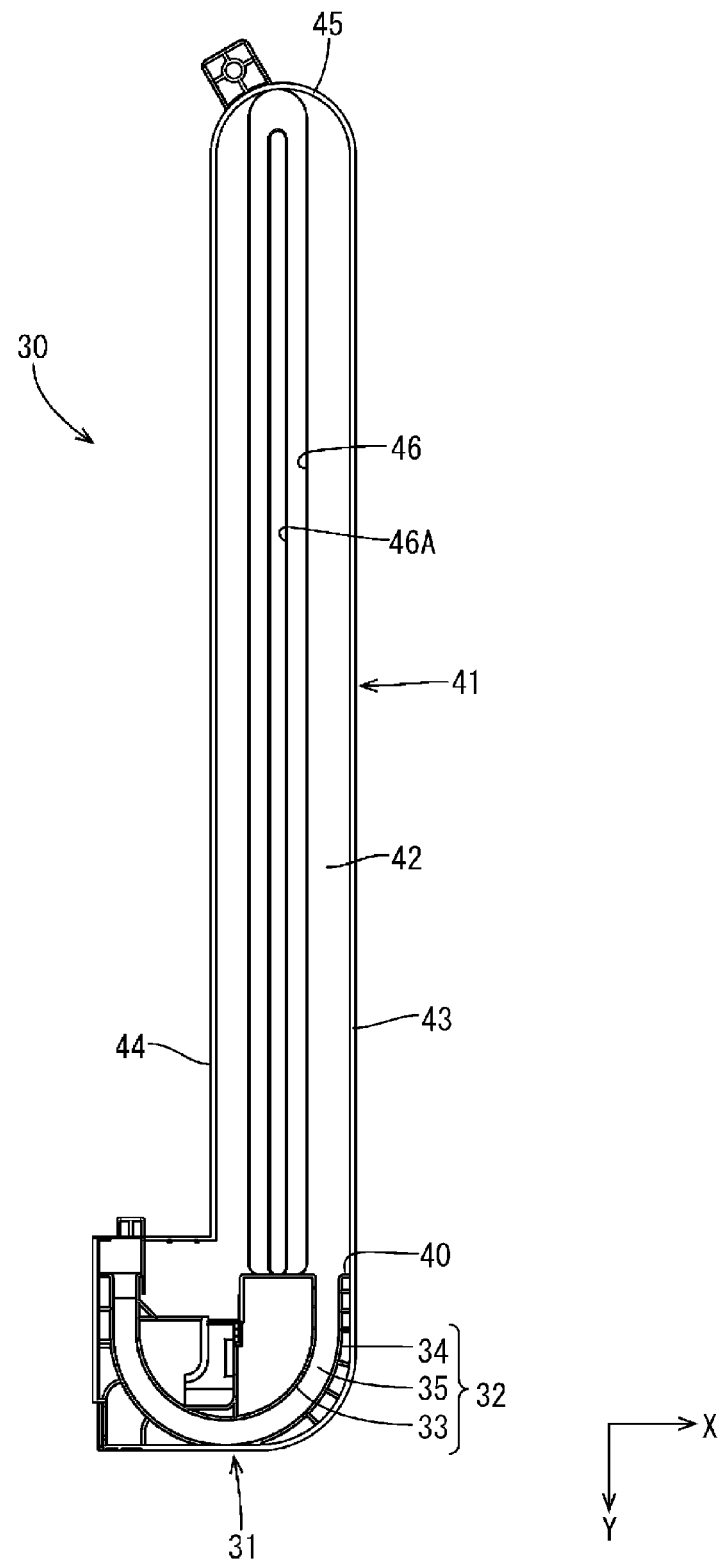
FIG. 4 is a plan view of the excess length accommodation part.
Figure 5:
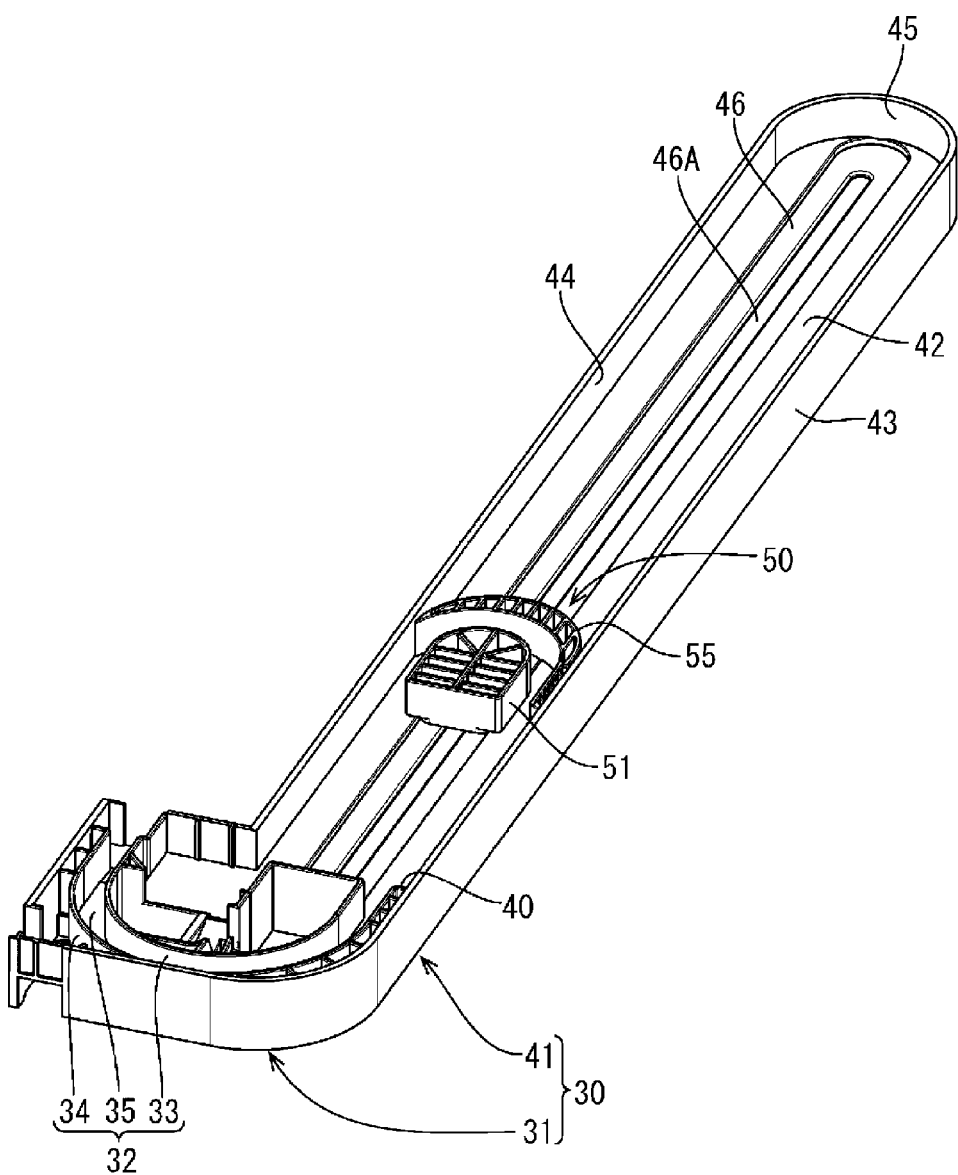
FIG. 5 is an oblique view of a state in which the slidable holding member is disposed on the excess length accommodation part.
Figure 6:
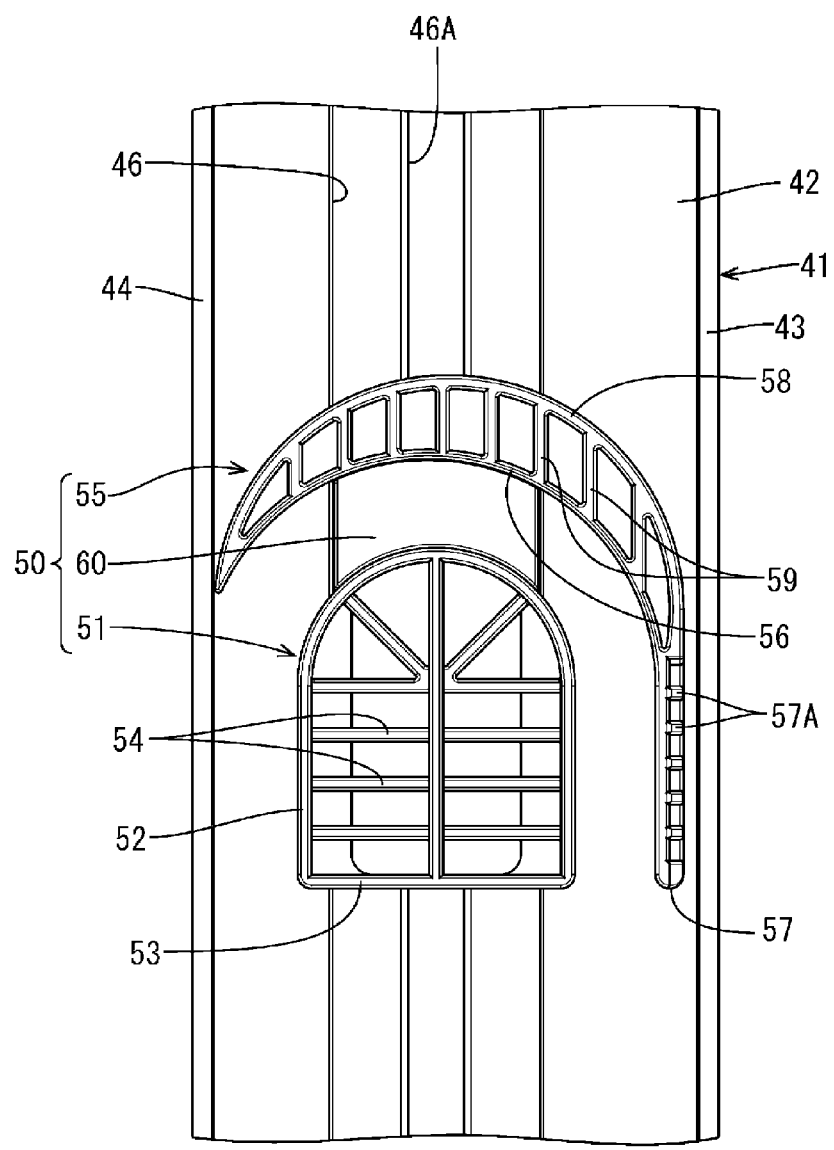
FIG. 6 is a partially enlarged plan view of FIG. 5.

An excess length accommodation part 30 with which the excess length of the wire harness 11 that is drawn out from the rail 20 is absorbed is disposed at a position that is adjacent to the front and side of the rail 20. As shown in FIG. 3 and FIG. 4, the excess length accommodation part 30 has a folding guide part 31 that curves the excess length of the wire harness 11 into a smooth U-shape and folds it back in such a manner that it runs along the rail 20, and an accommodation part 41 that accommodates the wire harness 11 that is folded back by the folding guide part 31.

When the seat 70 slides forward, the wire harness 11 inside the rail 20 moves forward, and the excess length of the wire harness 11 is accommodated in the accommodation part 41 through the folding guide part 31. The material forming the excess length accommodation part 30 is appropriately selected as needed, such as a synthetic resin or a metal.

The folding guide part 31 includes a folding groove 32 with a U-shape in a plan view that is composed of an inside curved wall 33 that is disposed at the inside in the folding direction of the wire harness 11, an outside curved wall 34 that is disposed at the outside at a predetermined distance from the inside curved wall 33, and a bottom wall 35 that couples the lower ends of the inside curved wall 33 and outside curved wall 34. As shown in FIG. 8, one end (on the left side in FIG. 8) of the folding groove 32 is coupled to the front end of that region of the rail 20 that accommodates the wire harness 11 (on the left side in FIG. 8, at a position near the left edge of the rail 20). The other end of the folding groove 32 is coupled to a position near the right edge of the accommodation part 41.

As shown in FIG. 3 and FIG. 4, the accommodation part 41 has a bottom wall 42, which extends in the front to back direction (Y direction) and whose rear edge has a semi-circular shape in plan view, a pair of a right wall 43 and left wall 44 which rises up from the side edges of the bottom wall 42 that extend in the front to back direction, and a rear wall 45 with a curved surface that couples the right wall 43 and left wall 44 at the rear side.

The right wall 43 is disposed further outward (to the right in FIG. 4) that that region out of the outside curved wall 34 of the folding guide part 31 that is adjacent to the right wall 43. In other words, the boundary between the right wall 43 of the accommodation part 41 and the outside curved left wall 34 has a step shape. Below, the portion with this step shape is called the "step part 40".

In addition, a wide-width movement guide groove 46 (one example of the movement guide part) that extends in the front to back direction (Y direction) is formed in the central part, with respect to the width direction (X direction), of the bottom wall 42 of the accommodation part 41. The movement guide groove 46 is provided across the entire length, in the front to back direction, of the accommodation part 41. The central part, with respect to the width direction (left to right direction, X direction), of the movement guide groove 46 is configured as a recess 46A that is indented downwards.

As shown in FIG. 8, the wire harness 11, which is drawn out from the front end part of the rail 20 is introduced into the accommodation part 41 through the folding groove 32 (the space between the inside curved wall 33 and outside curved wall 34) of the folding guide part 31, inside the excess length accommodation part 30, and is routed to the rear along the right wall 43 while being held at a predetermined distance to the right wall 43 by the step part 40. The portion of the wire harness 11 that runs along this right wall 43 is called the "first linear part 11A". The rear side (opposite the folding guide part 31) of the first linear part 11A is curved and folded back again towards the rail 20 (to the left), and is routed forward along the inner face of the left wall 44. Below, the curved portion is called the "curved part 11B", and the portion that runs along the left wall 44 is called the "second linear part 11C". A plurality of electrical wires 12 is drawn out from the outer covering 13 at the front end part of the left wall 44, and although it is not shown in detail in the figures, the plurality of electrical wires 12 is drawn out to the outside of the wire harness routing device 10 through the area below the folding groove 32.

(Slidable Holding Member 50)

The wire harness routing device 10 of the present embodiment includes a slidable holding member 50 that can move in the front to back direction (Y direction) inside the accommodation part 41.

The slidable holding member 50 includes an inside guide part 51 that is disposed at the inside in the curve direction C of the curved part 11B, an outside guide part 55 that is disposed at the outside (outward of the inside guide part 51) in that curve direction C, and a coupling part 60 that couples the inside guide part 51 and outside guide part 55 together, in the region that corresponds to the curved part 11B of the wire harness 11 (see FIG. 10 to FIG. 13).

The inside guide part 51 has an inside guide wall 52 that is U-shaped in plan view, whose back face side is configured as a curved face that is curved in a semi-circular shape in plan view and wherein the two sides of the curved face are configured as a pair of planes that extend forwards. The pair of front end edges of the inside guide wall 52 is coupled by a flat plate-shaped front wall 53, forming a D-shaped frame shape overall. The inside guide wall 52 and front wall 53 are cross-linked by a plurality of cross-linking parts 54. The height dimensions of this inside guide wall 52, front wall 53 and plurality of cross-linking parts 54 are all set at the same size.

The outside guide part 55 includes an outside guide wall 56 that has a curved face that is separated by a predetermined distance from the back face (curved face) of the inside guide wall 52 to the rear side. A spacer wall 57 (one example of the separation guide part) that extends forwards is provided as an extension at the end of the outside guide wall 56 that is on the right side in FIG. 11 (the front part on one side).

The spacer wall 57 is separated by a predetermined distance from the side face at the right side of the inside guide wall 52, and the face that is opposed to the inside guide wall 52 (the face on the left) has a planar shape. In addition, on the face on the other side (the face on the right) a plurality of ribs 57A, which protrude towards the right wall 43 of the accommodation part 41, are provided extending in the vertical direction (the direction that intersects orthogonally with the paper plane of FIG. 11, Z direction). The spacer wall 57 is set to a length at which its front end (the lower end in FIG. 11) is at the same position as the front end of the inside guide part 51 (the front face of the front wall 53).

The outside guide part 55 has a curved plate-shaped rear wall 58 that projects rearwards, and is configured in a roughly J-shape in plan view overall. The outside guide part 56 and rear wall 58 are cross-linked by a plurality of cross-linking parts 59. The height dimensions of this outside guide wall 56, rear wall 58, plurality of cross-linking parts 59 and spacer wall 57 are all set at the same size. In addition, the outside guide part 55 is set to the same height as the inside guide part 51. Moreover, the width of the left to right dimension (X direction) of the outside guide part 55 is set to a size that is somewhat smaller than the width of the accommodation part 41.

The inside guide part 51 and the outside guide part 55 are configured in one piece by means of a plate-shaped coupling part 60 that extends in the front to back direction (Y direction). As shown in FIG. 9, the coupling part 60 has a plate shape whose width in the left to right direction (X direction) is slightly narrower than the inside guide part 51, and in addition it is set to a width that is more or less exactly fitted to the inside of the movement guide groove 46 (one example of the movement guide groove), and it is provided at the lower end part in such a manner that it extends from the front end of the inside guide part 51 to the rear end of the outside guide part 55. A pair of guide ribs 61 that extend in the front to back direction and that can be accommodated inside the above-described movement guide groove 46 protrude downwards on the bottom face (lower face) of the coupling part 60 (see FIG. 13). Due to these guide ribs 61, the bottom face of the coupling part 60 is disposed in a position that is separated from the movement guide groove 46.

The space between the inside guide wall 52 and outside guide wall 56 serves as a curved sliding guide 63, and the wire harness 11 is disposed there. As noted above, the plurality of electrical wires 12 of the wire harness 11 is covered by an outer covering 13. The distance of the space between the inside guide wall 52 and outside guide wall 56 is set to a size that is larger than the width of the outer covering 13. Owing to this, the outer covering 13 can slide in the left to right direction (X direction) through the gap (the curved sliding guide part 63) between the inside guide wall 52 and outside guide wall 56 while maintaining a curved state.

As shown in FIG. 7 and FIG. 8, the wire harness 11, which is introduced from the folding guide part 31 into the accommodation part 41 and is disposed in a straight line (the first linear part 11A), enters the space between the spacer wall 57 and the side face on the right side of inside guide part 52, and is introduced into the curved sliding guide part 63. Then, it is curved along the curved sliding guide part 63 (curved part 11B) and folded back in the direction along the rail 20 (the front to back direction, Y direction), and is disposed in a straight line towards the front along the left wall 44 of the accommodation part 41 (second linear part 11C).

Figure 1:
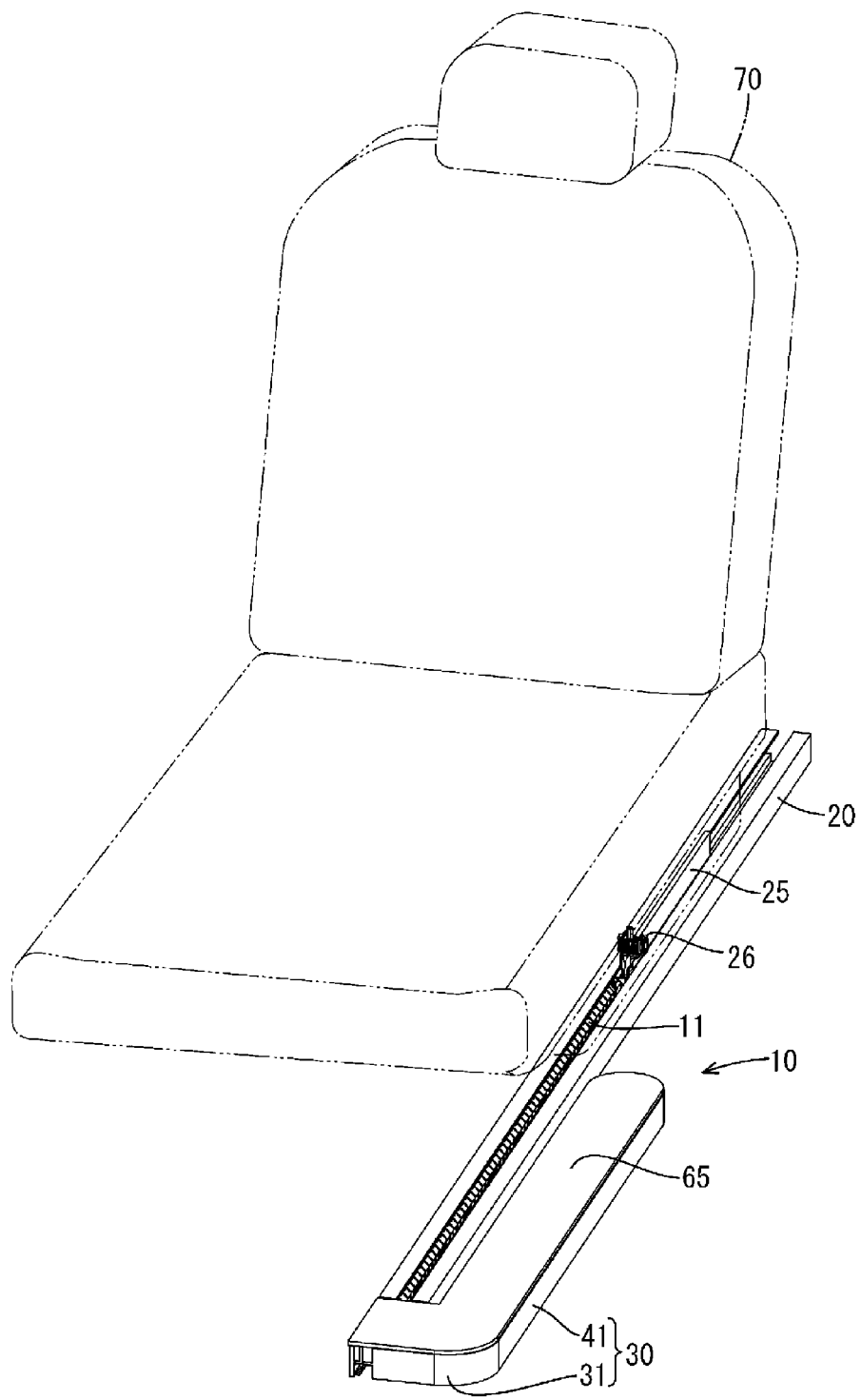
FIG. 1 is an oblique view that shows the connected state between the seat and the wire harness routing device of one embodiment.

As shown in FIG. 1, a cover 65 is mounted on the opening (on the upper side) of the excess length accommodation part 30. As shown in FIG. 9, the cover 65 is configured such that, when it covers the excess length accommodation part 30, only a slight gap, to the extent that the cover 65 does not abrade with the slidable holding member 50 is interposed in the space between the cover 65 and the slidable holding member 50. Whenever the slidable holding member 50 inclines with respect to the bottom wall 42 of the accommodation part 41, the slidable holding member 50 comes into direct contact with the cover 65, so the inclination of the slidable holding member 50 is prevented by the cover 65 (one example of the inclination restricting part).

(Operation of the Embodiment)

According to the wire harness routing device 10 of the present embodiment, when the seat 70 slides forwards, the one end of the wire harness 11 that is coupled to the slider 25 (the end on the left) moves forwards, and the excess length of the wire harness 11 passes through the folding guide part 31 and is accommodated in the accommodation part 41.

To describe the above in more detail, the wire harness 11, which is pushed out from the front end of the rail 20, is pressed against the outside curved wall 34 of the folding groove 32, is curved and folded back in the direction along the rail 20 (the front to back direction Y) while it is guided by the outside curved wall 34, and is pushed into the accommodation part 41. At this time, because a step part 40 has been formed on the boundary portion between the outside curved wall 34 and the right wall 43 of the accommodation part 41, the wire harness 11 is routed to the rear in a straight line along the right wall 43 while being held at a predetermined distance to the right wall 43 (first linear part 11A).

The rear side of the wire harness 11 (first linear part 11A), which is disposed in a straight line, is inserted into the curved sliding guide part 63 of the slidable holding member 50 and is curved (curved part 11B). The curved part 11B presses rearwards the outside guide wall 56 of the outside guide part 55 while sliding towards the left (towards the rail 20) through the inside of the curved sliding guide part 63 due to the fact that it is pushed rearwards from the first linear part 11A side (see FIG. 14). Owing to this, the slidable holding member 50 moves to the rear inside the accommodation part 41.

At this time, since the slidable holding member 50 is provided with a spacer wall 57 that is positioned between the first linear part 11A of the wire harness 11 and the right wall of the accommodation part 41, the abrading of the wire harness 11 with the right wall 43 is prevented. Moreover, because as described above the end of the first linear part 11A at the folding guide part 31 is separated from the right wall 43 by the step part 40, the first linear part 11A of the wire harness 11 bridges the space between the step part 40 and the spacer wall 57, while being more reliably separated from the right wall 43.

On the other hand, when the seat 70 slides backwards, the end of the wire harness 11 that is coupled to the slider 25 (the end on the left), moves backwards, and the excess length of the wire harness 11 is pulled from the accommodation part 41 to the folding guide part 31.

Figure 15:
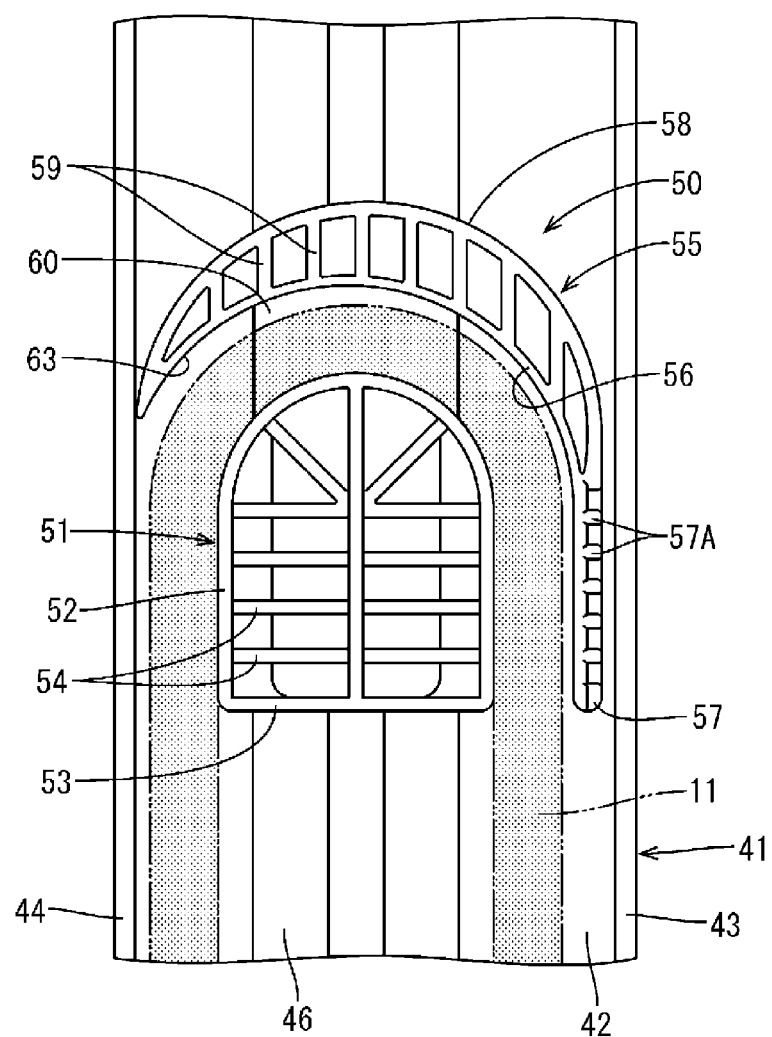
FIG. 15 is a conceptual diagram that shows another relationship between the slidable holding member and the wire harness.

To describe the above in more detail, as shown in FIG. 15, owing to the fact that the curved part 11B, which is disposed inside the curved sliding guide part 63 of the slidable holding member 50, is pulled to the first linear part 11A side, it pulls the inside guide wall 52 of the inside guide part 51 forwards from the back face side while sliding through the inside of the curved sliding guide part 63 to the right (away from the rail 20). Thus, the slidable holding member 50 moves forwards inside the accommodation part 41.

(Effects of the Embodiment)

In the wire harness routing device 10 of the present embodiment, the accommodation part 41 is provided with a slidable holding member 50 that can move along the extension direction (Y direction) of the first linear part 11A while holding the curved part 11B of the wire harness 11 such that it can slide along that curve direction C. Moreover, this slidable holding member 50 is provided with a spacer wall 57 that extends forwards from the outside guide wall 56 and is located between the first linear part 11A and the right wall 43.

According to such a configuration, because the first linear part 11A of the wire harness 11 is separated from the right wall 43 of the accommodation part 41 by the spacer wall 57, the abrading between the wire harness 11 and the right wall 43 can be prevented. Owing to this, damage to the wire harness 11 can be avoided, and the sounds generated by this can be reduced.

In addition, a movement guide groove 46 is provided on the bottom face 42 of the accommodation part 41, and the coupling part 60 of the slidable holding member 50 is more or less exactly fitted thereto. Thus, the movement of the slidable holding member 50 is guided in a direction parallel to the extension direction of the first linear part 11A (Y direction). Therefore, it is possible to make the slidable holding member 50 moves stably in the normal movement direction inside the accommodation part 41.

Foreign matter may enter into the movement guide groove 46, but because a recess 46A has been provided in the movement guide groove 46 in the present embodiment, the foreign matter can be discharged into the recess 46A. In other words, the effects of the rattling due to foreign matter during the sliding of the slidable holding member 50 can be prevented by the recess 46A.

In addition, because the width of the outside guide part 55, in other words the overall width of the slidable holding member 50, is set such that it is smaller than the width of the accommodation part 41, the spacer wall 57 is disposed at a distance from the right wall 43. According to such a configuration, not only the wire harness 11 but also the spacer wall 57, that is, the slidable holding member 50, is separated from the right wall 43, so the generation of sound can be prevented even better.

In addition, the excess length accommodation part 30 is covered by the cover 65, and in a state in which the excess length accommodation part 30 is covered, only a gap to the extent that the cover 65 does not abrade with the slidable holding member 50 is interposed in the space between the cover 65 and the slidable holding member 50. In other words, whenever the slidable holding member 50 inclines due to vibration, etc. with respect to the bottom wall 42 of the accommodation part 41, the slidable holding member 50 is abuts against the cover 65, and the inclination of the slidable holding member 50 is prevented by the cover 65 (one example of the inclination restricting part).

In addition, the folding guide part 31 has an outside curved wall 34 that curves the wire harness 11 in a direction parallel to the rail 20 (Y direction), and the right wall 43 of the accommodation part 41 is disposed further outward than the outside curved wall 34 at the boundary with the outside curved wall 34, forming a step part 40 in the space between the folding guide part 31 and the outside curved wall 34.

Therefore, because the first linear part 11A of the wire harness 11, which is introduced from the folding guide part 31 into the accommodation part 41, is separated from the right wall 43 by not only the spacer wall 57 but also the step part 40, the abrading between the wire harness 11 and the right wall 43 of the accommodation part 41 can be prevented more reliably.

Moreover, in the wire harness 11 the area around the plurality of electrical wires 12 is covered by an outer covering 13, and bending of the outer covering 13 is allowed in only one direction. Therefore, damage to the electrical wires 12 by the outer covering 13 can be prevented, and in addition the bending of the wire harness 11 in a direction other than the direction in which the wires 12 are supposed to curve can be prevented.

As described above, according to the wire harness routing device 10 of the present embodiment, it is possible to prevent the abrading between the wire harness 11 and the right wall 43 of the accommodation part 41.

Other Embodiments

The technique disclosed in the present specification is not limited to the embodiment described by the above description and figures, and for example embodiments like those described below are also included in the technical scope.

(1) In the above embodiment, an embodiment in which the separation guide part is a spacer wall 57 was shown, but the separation guide part may also be a projecting part or the like that projects from the outside guide part 55 towards the right wall 43. In a word, as long as the wire harness is separated from the side wall of the accommodation part, there is no limitation to the above-described embodiment.

(2) In the above-described embodiment, not only the wire harness 11 but also the spacer wall 57 (separation guide part) is disposed at a distance from the right wall 43, but it is also possible that the separation guide part is in direct contact with the side wall.

(3) If the width of the slidable holding part 50 is more or less the same as the width of the accommodation part 41, the movement guide part may be omitted.

(4) In the above-described embodiment, a separation guide part (spacer wall 57) is provided only on that side of the slidable holding member 50 that is opposed to the right wall 43, but it may also be provided on the left wall 44.

(5) The step part 40 may be omitted, and any configuration is possible in which the wire harness 11 that is drawn out from the folding guide part 31 does not abrade with the right wall 43.

(6) In the above-described embodiment, the bending of the outer covering 13 is allowed in only one direction, but bending in other directions may also be possible.

(7) A soundproofing material may be provided between the wire harness 11 and the right wall 43 or left wall 44. According to such a configuration, the generation of sound can be prevented by the soundproofing material even if the wire harness 11 and the right wall 43 or left wall 44 come in contact.

LIST OF REFERENCE NUMERALS

10: Wire harness routing device
11: Wire harness
11A: First linear part (linear part)
11B: Curved part
11C: Second linear part
12: Electric wire
13: Outer covering
20: Rail
25: Slider
30: Excess length accommodation part
31: Folding guide part
32: Folding groove
33: Inside curved wall
34: Outside curved wall
40: Step part
41: Accommodation part
42: Bottom wall
43: Right wall (side wall)
44: Left wall
46: Movement guide groove (movement guide part)
50: Slidable holding member
51: Inside guide part
52: Inside guide wall
55: Outside guide part
56: Outside guide wall
57: Spacer wall (separation guide part)
60: Coupling part (movement guide part)
61: Guide rib
63: Curved sliding guide part
65: Cover (inclination restricting part)

C: Curve direction

Y: Direction along the rail, extending direction of the linear part

Z: Direction that intersects with the bottom wall

The invention claimed is:

1. A wire harness routing device, comprising:

a wire harness, one end of which is coupled to a slider that is slidably attached to a rail, and the other end of which is drawn out from the rail, a folding guide part, which curves the wire harness that is drawn out from the rail and folds it back in a direction along the rail, and an accommodation part, which has a bottom wall and a side wall that rises up from the side edge of said bottom wall, and accommodates the wire harness that is folded back by the folding guide part, wherein the wire harness has, inside the accommodation part, a straight line-shaped linear part that is disposed along the rail, and a curved part that is further folded in such a manner that the wire harness runs along the rail, the curved part being disposed on that side of the linear part that is opposite of the folding guide part, the accommodation part is provided with a slidable holding member that can move along the extension direction of the linear part while holding the curved part slidably along the curve direction of the curved part, and the slidable holding member is provided with a separation guide member that separates the linear part from the side wall.

2. The wire harness routing device according to claim 1, wherein the slidable holding member has an outside guide wall that guides the wire harness in the curve direction, and the separation guide part is a spacer wall that extends from the outside guide wall and is positioned between the linear part of the wire harness and the side wall.

3. The wire harness routing device according to claim 1, further comprising a movement guide part that guides the movement of the slidable holding member in the direction along the extension direction of the linear part.

4. The wire harness routing device according to claim 1, wherein the separation guide part is disposed at a distance from the side wall.

5. The wire harness routing device according to claim 1, further comprising an inclination restricting part that restricts the inclination in the direction that intersects with the bottom wall of the slidable holding member.

6. The wire harness routing device according to claim 1, wherein the folding guide part has an outside curved wall that curves the wire harness in the direction along the rail, and the side wall of the accommodation part is disposed further outward than that region of the outside curved wall that is adjacent to the side wall, creating a step shape with the outside curved wall.

7. The wire harness routing device according to claim 1, wherein in the wire harness the area around the plurality of electrical wires is covered by an outer covering, and bending of the outer covering is allowed in only one direction.

8. The wire harness routing device according to claim 1, wherein a soundproofing material is provided between the wire harness and the side wall.

* * * * *